US006345090B1

(12) United States Patent
Walker et al.

(10) Patent No.: US 6,345,090 B1
(45) Date of Patent: *Feb. 5, 2002

(54) CONDITIONAL PURCHASE OFFER MANAGEMENT SYSTEM FOR TELEPHONE CALLS

(75) Inventors: Jay S. Walker, Ridgefield; Thomas M. Sparico, Riverside, both of CT (US); Bruce Schneier, Minneapolis, MN (US)

(73) Assignee: priceline.com Incorporated, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/923,317

(22) Filed: Sep. 4, 1997

Related U.S. Application Data

(63) Continuation-in-part of application No. 08/889,319, filed on Jul. 8, 1997, now Pat. No. 6,085,169, which is a continuation-in-part of application No. 08/707,660, filed on Sep. 4, 1996, now Pat. No. 5,794,207.

(51) Int. Cl.[7] .......................... H04M 15/00; G06F 17/60

(52) U.S. Cl. ............................ 379/114.12; 379/114.03; 379/114.05; 379/114.19; 705/23; 705/37

(58) Field of Search ................................. 379/111, 112, 379/114.03, 114.05, 114.12, 114.19, 115, 121, 207, 144; 705/10, 400, 412, 23, 26, 37

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 4,247,759 A | 1/1981 | Yuris et al. |

(List continued on next page.)

FOREIGN PATENT DOCUMENTS

| | | | |
|---|---|---|---|
| WO | 96/34356 | 10/1996 | |
| WO | 97/16797 | 5/1997 | ........... G06F/17/60 |
| WO | 97/46961 | 12/1997 | |

OTHER PUBLICATIONS

Lancorp Mortgage Services, http://www.lancorp-mortgage-.com/retailpa.htm, 1998.

(List continued on next page.)

*Primary Examiner*—Curtis Kuntz
*Assistant Examiner*—Binh K. Tieu
(74) *Attorney, Agent, or Firm*—Morgan & Finnegan, L.L.P.

(57) ABSTRACT

A conditional purchase offer (CPO) management system is disclosed for receiving and processing CPOs for telephone calls from calling parties. The CPO management system processes the CPO to determine whether one or more long distance carriers is willing to accept a given CPO and complete a telephone call in accordance with restrictions defined by the calling party. If accepted, the CPO management system binds the calling party on behalf of the accepting interexchange carrier, to form a legally binding contract. A calling party can submit a CPO for an individual telephone call, a package of calls to one or more called parties, or for a contract to provide telephone service for a predefined period of time. The conditions defined by the calling party may include the telephone number to be called, the maximum price, one or more preferred carriers, if any, as well as any time limitations, such as a particular time-of-day or minimum call duration. Preferably, the calling party initially contacts the CPO management system, for example, by means of telephone or Internet connection, to provide the CPO management system with the terms of the CPO. The CPO management system preferably provides an optional agency feature that permits the CPO management system to accept or reject a given CPO on behalf of certain agency-based interexchange carriers who save delegated such authority to the CPO management system. The calling party is notified of the response of the interexchange carriers and, if accepted, the calling party is bound to complete and pay for a call having the appropriate restrictions which meet the conditions defined by the calling party.

50 Claims, 12 Drawing Sheets

U.S. PATENT DOCUMENTS

| | | |
|---|---|---|
| 4,449,186 A | 5/1984 | Kelly et al. |
| 4,553,222 A | 11/1985 | Kurland et al. |
| 4,677,552 A | 6/1987 | Sibley, Jr. |
| 4,751,728 A | 6/1988 | Treat |
| 4,789,928 A | 12/1988 | Fujisaki |
| 4,799,156 A | 1/1989 | Shavit et al. |
| 4,903,201 A | 2/1990 | Wagner |
| 4,931,932 A | 6/1990 | Dalnekoff et al. |
| 5,021,953 A | 6/1991 | Webber et al. |
| 5,136,501 A | 8/1992 | Silverman et al. |
| 5,168,446 A | 12/1992 | Wiseman |
| 5,191,523 A | 3/1993 | Whitesage |
| 5,191,613 A | 3/1993 | Graziano et al. |
| 5,224,034 A | 6/1993 | Katz et al. |
| 5,243,515 A | 9/1993 | Lee |
| 5,253,165 A | 10/1993 | Leiseca et al. |
| 5,262,941 A | 11/1993 | Saladin et al. |
| 5,283,731 A | 2/1994 | Lalonde et al. |
| 5,297,031 A | 3/1994 | Gutterman et al. |
| 5,329,589 A | 7/1994 | Fraser et al. |
| 5,331,546 A | 7/1994 | Webber et al. |
| 5,361,199 A | 11/1994 | Shoquist et al. |
| 5,404,291 A | 4/1995 | Kerr et al. |
| 5,420,914 A | 5/1995 | Blumhardt |
| 5,426,281 A | 6/1995 | Abecassis |
| 5,444,630 A | 8/1995 | Dlugos |
| 5,467,269 A | 11/1995 | Flaten |
| 5,500,793 A | 3/1996 | Deming, Jr. et al. |
| 5,517,555 A | 5/1996 | Amadon et al. |
| 5,519,769 A | 5/1996 | Weinberger et al. |
| 5,553,131 A | 9/1996 | Minervino, Jr. et al. |
| 5,557,517 A | 9/1996 | Daughterty, III |
| 5,557,518 A | 9/1996 | Rosen |
| 5,570,283 A | 10/1996 | Shoolery et al. |
| 5,592,375 A | 1/1997 | Salmon et al. |
| 5,606,602 A * | 2/1997 | Johnson et al. ............. 379/115 |
| 5,611,052 A | 3/1997 | Dykstra et al. |
| 5,615,269 A | 3/1997 | Micali |
| 5,664,115 A | 9/1997 | Fraser |
| 5,675,636 A * | 10/1997 | Gray .......................... 379/114 |
| 5,689,652 A | 11/1997 | Lupien et al. |
| 5,694,551 A | 12/1997 | Doyle et al. |
| 5,696,965 A | 12/1997 | Dedrick |
| 5,715,402 A | 2/1998 | Popolo |
| 5,717,989 A | 2/1998 | Tozzoli et al. |
| 5,732,400 A | 3/1998 | Mandler et al. |
| 5,745,882 A | 4/1998 | Bixler et al. |
| 5,757,917 A | 5/1998 | Rose et al. |
| 5,758,328 A | 5/1998 | Giovannoli |
| 5,774,883 A | 6/1998 | Andersen et al. |
| 5,790,642 A * | 8/1998 | Taylor et al. ............... 379/112 |
| 5,794,207 A | 8/1998 | Walker et al. |
| 5,794,219 A | 8/1998 | Brown |
| 5,797,127 A | 8/1998 | Walker et al. |
| 5,799,285 A | 8/1998 | Klingman |
| 5,802,502 A * | 9/1998 | Gell et al. .................... 705/37 |
| 5,809,478 A | 9/1998 | Greco et al. |
| 5,822,410 A * | 10/1998 | McCausland et al. ....... 379/111 |
| 5,826,244 A | 10/1998 | Huberman |
| 5,832,452 A | 11/1998 | Schneider et al. |
| 5,835,896 A | 11/1998 | Fisher et al. |
| 5,845,265 A | 12/1998 | Woolston |
| 5,878,403 A | 3/1999 | DeFrancesco et al. |
| 5,915,214 A | 6/1999 | Reece et al. |
| 5,917,897 A * | 6/1999 | Johnson et al. ............. 379/114 |
| 5,995,602 A * | 11/1999 | Johnson et al. ............. 379/116 |
| 6,005,925 A * | 12/1999 | Johnson et al. ............. 379/112 |
| 6,005,926 A * | 12/1999 | Mashinsky .................. 379/114 |
| 6,047,274 A * | 4/2000 | Johnson et al. ............. 705/412 |

OTHER PUBLICATIONS

Inland Mortgage Corporation, http://inlandmortgage.com/index.htm, 1998.

The Mortgage Store, http://www.mortgagestore.com, 1998.

Golden Age Antiques and Collectibles Online Auction, http://www.goldage.com, 1997.

Moran, Susan, "Xerox Won't Duplicate Past Errors", Business Week, Sep. 29, 1997.

Coleman, Zach, "Electronic Trading System Matches Buyers, Seller", Atlanta Business Chronicle, vol. 20; No. 12; p. 37A, Aug. 22, 1997.

"What's Holding Up E–Cash?", Cybernautics Digest, vol. 3; No. 7, Finance.

Resnick, Paul et al, "Roles For Electronic Brokers", http://ccs.mit.edu/CCSWP179.htm 1997.

Philatelists Online Information, http://www506.bonsai.com/q@1313541hyljf/infop.html, 1997.

Sports trade Information, http://www.sportstrade.com/infos.html, 1997.

Numismatists Online Information, http://www.numismatists.com/info.html, 1997.

Sell and Trade Internet Marketplace, Sell and Trade, http://sellandtrade.com/script/main.asp, 1997.

Kay, Alan, "Chapter 7 Future Research", 1997.

Trade–direct, http://www.trade–direct.com. 1997.

"Internet Mortgage Service Eliminates Loan Agents and Passes Commissions on to the Consumer", Yahoo! Finance, 1997.

Negroponte, Nicholas, "Pay Whom Per What When, Part 2", Negroponte, Issue 5.03, 1997.

"Ticketing revolution Could Triple Airline Profits, Analyst Says", Aviation Daily, vol. 325; No. 11; p. 87, 1996.

"Auctioning Unsold Airline Tickets", adapted extract from Insight (USA), The Global Ideas Bank, 1996.

Rockoff, Todd E., et al., "Design of an Internet–based system for remote Dutch auctions," Internet Research: Electronic Networking Applications and Policy, vol. 5, No. 4, pp. 10–16, 1995.

Franklin, Matthew K., et al., "The Design and Implementation of a Secure Auction Service," Proceedings: 1995 IEEE Symposium on Security and Privacy, pp. 2–14, 1995.

Tenenbaum, Jay M., et al.,"CommerceNet: Spontaneous Electronic Commerce on the Internet," 1995 IEEE Spring Conference, pp. 38–43.

Sirbu, Marvin and Tygar, J.D., "NetBill: An Internet Commerce System Optimized for Network Delivered Services," IEEE 1995 Spring Conference, pp. 20–25.

Bunker, Ted, "How Auction Technology Sped And Enhanced Sale Of Radio Licenses," Investor's Business Daily, Executive Update, Regulation, p. A3, Feb. 24, 1995.

"AucNet: The Story Continues", Harvard Business School, Jan. 17, 1995.

Anand, R., and Rao, M. Padmaja, "The Electronic Flea Market", IBM Research Division: Research Report, pp. 1–18, Jul. 28, 1994.

"Unusual Farmland Auction Set," Harrison Scott Publications, Liquidation Alert, Mar. 28, 1994.

"The Computer Museum brings auction block to cyberspace in First Internet Auction," Business Wire, Mar. 14, 1994.

Freeman, Brian and Gideon, Lidor, "Hosting Services—Linking the Information Warehouse To the Information Consumer," IEEE 1994 Spring Conference, pp. 165–171.

Booker, Ellis, "Mega real estate auction counts on imaging," Computerworld, p. 20, Dec. 7, 1992.

Abstract: "A forward/reverse auction algorithm for asymmetric assignment problems," Computational Optimization and Applications, Dec. 1992.

Abstract: "Marketel Shuts Doors," Travel Agent Magazine, Mar. 23, 1992.

Cass, Maxine, "West Coast Agents Remain Skeptical About New Air Ticket Sales Plan; Marketel: Airline ticket sales system sparks concern," Travel Agent Magazine, p. 50, Sep. 2, 1991.

Bookit!, "Airline Ticket Purchase Order For Business & Leisure Travel", Marketel International, Inc., 1991.

Inhaber, Herbert, "How To Solve the Problem of Siting Nuclear Waste," Transactions of the American Nuclear Society, vol. 62, Nov. 11–15, 1990.

Dyson, Esther, "Information, Bid and Asked," Forbes, Aug. 20, 1990.

"Mercado electronico, El chance de regatear por computador", CIENCIA Technologia E Informatica, Mar. 21, 1990 (Transaction enclosed).

Cole, Jeff, "Fare bidding plan could be the ticket", St. Paul Pioneer Press Dispatch, Mar. 11, 1990.

Miller, Ross M., "The Design of Decentralized Auction Mechanisms that Coordinate Continuous Trade in Synthetic Securities," Journal of Economic Dynamics and Control, pp. 237–253, 1990.

"Business Briefing, Airline Seats May Go on the Auction Block", Insight on the news, Dec. 4, 1989.

"Business Travel Update, Automation", Travel Weekly, Nov. 27, 1989.

Munro, Don and McCann, David, "A New Way To Purchase Travel, Automated Service Would Let Companies Bid For Already–Filled Airline Seats", Business Travel News, Nov. 6, 1989.

"An Electronic Auction Ahead For Airline CRS's?", The Business Week Newsletter for Information Executives, Oct. 27, 1989.

Cohen, Danny, "Electronic Commerce," ISI Research Report, University of Southern California, Oct. 1989.

"From Airline Tickets to Human organs, the Electronic Markets are Booming", Times, vol. 3, No. 50, Aug. 14, 1989.

Coyne, Andrew, "Unbundling ideas may alter world of politics," The Financial Post (Toronto), Section 1, p. 11, Sep. 27, 1989.

Malone, Thomas W., et al., "Electronic Markets and Electronic Hierarchies," Communications of the ACM, vol. 30, No. 6, Jun. 1987.

"AucNet: TV Auction Network System," Harvard Business School, Jul. 19, 1989.

Sammer, Harald W., "Online Stock Trading Systems: Study of an Application," IEEE 1987 Spring Conference, pp. 161–162.

Littlefair, T., "Homelink: a unique service," Computer Bulletin, pp. 12–14, Jun. 1986.

Banatre, Jean–Pierre et al., "The Design and Building of Echere, a Distributed Electronic Marketing System," Communications of ACM, vol. 29, No. 1, Jan. 1986.

Turoff, Murray and Chinai, Sanjit, "An Electronic Information Marketplace," Elsevier Science Publishers B.V., pp. 79–90, 1985.

Banatre, Michel, "Distributed auction bidding system," IPC Business Press, Computer Communications, vol. 4, No. 4, Aug. 1981.

Koepper, Ken, "Room Inventory Auctioning: The Next CRS Generation", Lodging, Jan. 1990 at pp. 26, 29–30.

"Bid.com 1998 Third–Quarter Revenue Increases 12.5 Percent From Second Quarter", Business Wire, Oct. 29, 1998.

Final Report: Virtual Hospital (http://www.telemed.medadmin.uiowa.edu/TRCDocs/Pubs/FinalReport/cVirtualH/virtualH/virtualh02.html), download date: Sep. 20, 1998.

"First Source Become a Member", More Reasons To Join First Source! (http://www.fsource.com/bene.html), download date: Sep. 20, 1998.

Jeffrey Davis, "Big Storm rising", Business 2.0, Sep. 1998 at p. 60.

Suite 101.com (http://www.suite101.com/doc.cfm.presskit/questions), 1998.

Hapgood, Fred bidder Harvest, Sep. 1997, p. 58.

NASDAQ: What is NASDAQ?, selected pages downloaded from http://home.axford.com on Aug. 15, 1997.

NASDAQ Consolidated Subscriber Agreement, downloaded from www.pcquote.com/exchanges on Aug. 15, 1997.

TradingFloor: General Trading Information and Terms, downloaded from www.tradingfloor.com on Aug. 14, 1997.

HomeShark: Refinance Check, selected pages downloaded from www.homeshark.com on Aug. 13, 1997.

The Loan Process, downloaded from www.sdtech.com/mls/process on Aug. 7, 1997.

Trade–Direct: We Help You Trade With Confidence, selected pages downloaded from www.trade–direct.com on Aug. 6, 1997.

Classifieds2000: The Internet Classifieds, selected pages downloaded from www.classifieds2000.com on Aug. 6, 1997.

Internet Mortgage Service Eliminates Loan Agents and Passes Commissions on to the Consumer, Company Press Release, Yahoo Business Wire (Jun. 30, 1997).

Frequently Asked Questions About: Airhitch, selected pages downloaded from www.isicom.com.fr/airhitch on May 6, 1997.

Hitch a Flight to Europe, selected pages downloaded from www.travelassist.com on May 6, 1997.

Airhitch: Your Way to Low Cost Travel, selected pages downloaded from www.vaportrails.com on May 6, 1997.

Kelsey, J. and Schneier, B., Conditional Purchase Orders, $4^{th}$ ACM Conference on Computer and Communications Security, ACM Press, 117–124 (Apr. 1997).

Bryant, Adam, "Shaking Up Air Fares' Status Quo", The New York Times, Mar. 31, 1997.

Silverman, Robert, "GM Drives Wed Ad Insertion Network", Inside Media, Feb. 26, 1997, vol. 9, No. 4, p. 1; ISSN:1046–5316.

"Flycast Introduces Unique 'Open Exchange' Match–Making Service", Interactive Marketing News, Feb. 21, 1997, vol. 4, No. 8.

"UK's World Telecom Unveils New WorldSaver Tariffs," Newsbytes, Information Access Company (Feb. 13, 1997).

"TransQuest and Web Ventures Deliver Internet Booking for Delta Air Lines", PR Newswire, Dec. 10, 1996, Financial News Section.

"Affinicast Enables Web Sites That Listen and Adapt to Customer Affinities", PR Newswire, Dec. 3, 1996.

"Web Ventures Presents BookIt!" press release printed from http://www/webventures.com/bookit/(Web Ventures World Wide Web site) on Dec. 2, 1996.

"World's First Real–Time Travel Auction Service to Be Available Via World Wide Web: ETA To Open Bidding to Consumers," Business Wire, Dialog Trade & Industry Database (Nov. 4, 1996).

Gessel, Chris, "Trade Smarter: The Limit of Orders", Investor's Business Daily, Oct. 4, 1996, p A1.

CREST: Cruise/Ferry Revenue Management System, selected pages downloaded from www.rtscorp.com on Aug. 5, 1996.

Nishimoto, Lisa, "Travel Services Are First Online Commerce Offerings to Fly," Infoworld, Jul. 29, 1996, downloaded from http://www.infoworld.com.

About Rate Hunter, dowloaded from http://207.49.64.77/rhprodrh.htm on Jul. 14, 1996.

Cathay Pacific Online Ticket Bidding, World Internet News Digest (May 8, 1996).

Sothbey's General Information, downloaded from www-.sothebys.com (1996).

CyberBid, Net Fun Ltd.(1996).

Nimmer, Raymond, T., "Electronic Contracting; Legal Issues", 14 J. Marshall J.Computer & Info L.211, Winter, 1996.

American Law Institute, Draft–Uniform Commercial Code Revised Article 2 (Sales), parts 2, 3, and 7, pp. 1–15, Jan. 4, 1996.

Speidel, Richard E. & Schott, Lee A., "Impact of Electronic Contracting on Contract Formation Under Revised UCC Article 2, Sales",C878 ALI–ABA 335, Dec. 9, 1993.

Hainer, Cathy and Grossman,Cathy Lynn, "Where Vacationing Kids Get Good Care", USA Today, Apr. 1, 1992, at p. 4D.

Del Russo, Laura, "Ticket–Bidding Firm Closes Its Door," Travel Weekly, Mar. 12, 1992.

"Newsletters", The Atlanta Constitution, Mar. 1, 1992, p. K13.

"CRTL's Blue Ribbon Deals for 1992", Consumer Reports Travel Letter, Jan. 1992, vol. 8, No. 1, at pp. 3–5.

Traveler's Notes; Bookit Report, Consumer Reports Travel Letter, Dec. 1991 at p. 143.

Feldman, Joan M., "To Rein In Those CRSs; Computer Reservation Systems", Air Transport World, Dec. 1991, at p. 89.

"Money Briefs; Buy Low, Fly High", Gannet News Service, Nov. 20, 1991.

"Buy Low, Fly High", USA Today, Nov. 14, 1991 at p. 15.

Traveler's Notes; Easier Airfare Bidding, Consumer Reports Travel Letter, Oct. 1991 at p. 119.

Nelson, Janet "Practical Traveler; Airlines Relaxing Policy on No–Refund Tickets", The New York Times, Sep. 22, 1991 at p. 3 of Section 5.

Pelline, Jeff, "New Service; Now You Can Make a Bid on Your Next Airline Ticket Home", The Orange County Register, Sep. 1, 1991 at p. E01.

"Bookit Airfare Bidding System (Fax for Your Plane Ticket?)", Consumer Reports Travel Letter, Sep. 1991, pp. 97 & 106.

Upton, Kim "French Say Monoliths Off–limits to Visitors", Los Angeles Times, Aug. 25, 1991.

Pelline, Jeff, "Travelers Bidding on Airline Tickets; SF Firm Offers Chance for Cut–Rate Fares", San Francisco Chronicle, Section A4, Aug. 19, 1991.

Carey, Christopher, "Firm Offers Auction For Airline Tickets", St. Louis Post–Dispatch, Aug. 7, 1991 at p. 1B.

Del Rosso, Laura, "Marketel Says It Plans to Launch Air Fare 'Auction' in June", Travel Weekly, Apr. 29, 1991.

NASDAQ Adds Enhancement to SOES Limit Order File, Securities Week, Nov. 26, 1990, p. 5.

Ritter, Jeffrey B., "Scope of the Uniform Commercial Code: Computer Contracting Cases and Electrical Commercial Practices", 45 Bus. Law 2533, Aug., 1990.

Greenburg, Peter, S., "Judging DeRegulation", The Record, Jul. 22, 1990 at p. T01.

Greenburg, Peter S., "The Savvy Traveler: Lower Air Fares for Consumers Not in the Cards; Airlines: Remember When It Cost $16 to fly From Los Angeles to San Francisco? Then You Remember the Days Before DeRegulation. Since Then, Prices Have Soared", Los Angeles Times, Jul. 8, 1990 at p. L2.

Wallace, David, "Company Planning to Let Fliers Bid on Airfares", Philadelphia Business Journal, Mar. 26, 1990 at p. 15.

"Letter to Business Extra", The San Francisco Chronicle, Dec. 26, 1989 at p. C7.

Schrage, Michael, "An Experiment in Economic Theory; Labs Testing Real Markets", The Record Section B1, Nov. 26, 1989.

Schrage, Michael Innovation/Micheal Schrage: Laboratory Experiments with Market Economics, Los Angeles Times, Nov. 23, 1989 at p. D1.

Golden, Fran "AAL's Riga Doubts Marketel's Appeal to Retailers", Travel Weekly, Nov. 13, 1989.

Del Rosso, Laura, Firm Proposes ticket–bidding system; Marketel explores electronic auction of travel; Marketel International., Travel Weekly, Section No. 91, vol. 48, p. 1; Nov. 13, 1989.

Carlsen, Clifford, "Polaris Group Set to Fly the Leveraged Sky", San Francisco Business Times, Nov. 6, 1989 at p. 1.

Kuttner, Robert, "Computers May Turn the World into One Big Commodities Pit", Business Week, Sep. 11, 1989.

Carlsen, Clifford, "From Airline Tickets to Human Organs, the Electronic Markets Are Booming", San Francisco Business Times, Aug. 14, 1989 at p. 17.

"Public May Submit Bids To Get Bargain Rates", Wall Street Journal, Section 2; p. 1, Column 1; Aug. 1, 1989.

American Airlines Internet Silent Auction, selected pages downloaded from www.americanair.com.

Apollo Host Computer, selected pages downloaded from www.appollo.com.

"Auctioning unsold airline tickets." (http//www.newciv.org/GIB/BOV/BV–409.HTMI), at p. 1.

Cathay Pacific:CyberTraveler Auction #3—Official Rules, selected pages downloaded from www.cathaypacific.com.

CSM Online: About Collector's Super Mall downloaded from www.csmonline.com.

Sabre Decision Technologies, selected pages downloaded from www.sabre.com.

PhoneMiser: Frequently Asked Questions, downloaded from www.phonemiser.com.

The United Computer Exchange: How It All Works, selected pages downloaded from www.uce.com.

Tired of Shopping For the Best Home Loan?, Mortgage Loan Specialists.

About IAO, selected pages downloaded from www.iaoauction.com on Sep. 8, 1997 and Sep. 18. 1997.

About Rate Hunter, downloaded from http://207.49.64.77/rhprodrh.htm on Jul. 14, 1996.

Classifieds2000: The Internet Classified, selected pages downloaded from www.classifieds2000.com on Aug. 6, 1997.

CyberBid, Net Fun Ltd. (1996).

Laura Del Rosso, Marketel Says It Plans to Launch Air Fare 'Auction' in Jun; *Marketel International*, Inc., Travel Weekly, Apr. 29, 1991, at 1.

Classified2000: The Internet Classifieds, selected pages downloaded from www.classifieds2000.com on Aug. 6, 1997.

Laura Del Rosso, *Ticket–Bidding Firm Closes its Doors; Marketel International, Inc.*, Travel Weekly, Mar. 12, 1992, at 1.

Fran Golden, *AAL'S Riga Doubts Marketel's Appeal to Retailers; Chris Riga of American Airlines*, Travel Weekly, Nov. 13, 1989, at 4.

Robert Kuttner, *Computers May Turn the World Into One Big Commodities Pit*, Business Week, Sep. 11, 1989, at 17.

NASDAQ Consolidated Subscriber Agreement, downloaded from www.pcquote.com/exchanges on Aug. 15, 1997.

NASDAQ: What Is NASDAQ?, selected pages download from http://home.axford.com on Aug. 15, 1997.

Onsale: Auction Supersite, selected pages downloaded from www.onsale.com on Sep. 8, 1997.

Jeff Pelline, *Travelers Bidding on Airline Tickets; SF Firm Offers Chance for Cut Rate Fares*, The San Francisco Chronicle, Aug. 19, 1991, (News) at A4.

PhoneMiser: Frequently Asked Questions, downloaded from www.phonemiser.com (1997).

J. Kelsey and B. Schneier, Conditional Purchase Orders 4th, ACM Conference on Computer and Communications Security, ACM Press, 117–124 (Apr. 1997).

Michael Schrage, *An Experiment In Economic Theory; Labs Testing Real Markets*, The Record, Nov. 26, 1989, (Business) at B01.

The United Computer Exchange: How It All Works, selected pages download from www.uce.com on Jul. 23, 1997.

Trading Floor: General Trading Information and Terms, download from www.tradingfloor.com. on Aug. 14, 1997.

UK's World Telecom Unveils New WorldSaver Tariffs, Newsbytes, Information Access Company (Feb. 13, 1997).

* cited by examiner-

| NAME 440 | ADDRESS 445 | BINDING INFORMATION 450 | LOCAL SWITCH OPERATOR 455 | PHONE NUMBER (CUSTOMER ID) 460 |
|---|---|---|---|---|
| BILL SMITH | 111 MAIN ST. | CONTRACT | SNET | (203)555-1111 |
| JOE BLUE | 122 MAIN ST. | CONTRACT | SNET | (203)555-2222 |
| NANCY GREEN | 333 NORTH ST. | CONTRACT | SNET | (203)555-3333 |
| FRANK WHITE | 444 SOUTH ST. | 1111-4444-3333-2222 | SNET | (203)555-4444 |
| MARY RED | 555 WEST ST. | CONTRACT | NYNEX | (203)555-6660 |

CUSTOMER DATABASE 400

CARRIER DATABASE 500

| CARRIER NAME 540 | ADDRESS 545 | PUBLIC KEY 550 | CPO ACCEPTANCE RATE 555 |
|---|---|---|---|
| AT&T | 1234 SOUTH AVE. | 1234567 80 98765432 | 60% |
| MCI | 123 WEST AVE. | 99778844 66223355 | 20% |
| SPRINT | 9876 NORTH AVE. | 12123434 56567878 | 30% |
| RESELLER A | 2468 SOUTH AVE. | 98987676 54543232 | 50% |
| RESELLER B | 1357 EAST AVE. | 24246868 13135757 | 10% |

| CARRIER NAME 640 | DOMESTIC RATE 645 | INTERNATIONAL RATE 650 |
|---|---|---|
| AT&T | $.12/MIN. | $.15/MIN |
| MCI | $.13/MIN. | $.18/MIN |
| SPRINT | $.15/MIN. | $.20/MIN |
| RESELLER A | $.14/MIN | N/A |
| RESELLER B | $.13/MIN | N/A |

RATE DATABASE 600

605
610
615
620
625

CPO DATABASE 700

| CPO NUMBER 740 | DATE 745 | CUSTOMER ID NUMBER 750 | CALLED PARTY NUMBER 755 | RESTRICTIONS 760 | ACCEPTING CARRIER 765 | PRICE 770 | STATUS 775 |
|---|---|---|---|---|---|---|---|
| 4116 | 8/1/97 | (203)555-1111 | 1-201-555-4578 | | | $5.00 | REJECTED |
| 4117 | 8/1/97 | (203)555-2222 | 1-359-555-1296 | 20 MINUTE LIMIT | AT&T | $10.00 | ACCEPTED |
| 4118 | 8/1/97 | (203)555-3333 | 1-478-555-3572 | 60 MINUTE LIMIT | AT&T | $22.00 | ACCEPTED |
| 4119 | 8/1/97 | (203)555-4444 | 1-789-555-6521 | NO LIMIT | MCI | $17.00 | ACCEPTED |
| 4120 | 8/1/97 | (203)555-6660 | 1-862-555-1595 | NO LIMIT | | $15.00 | PENDING |

FIG. 7

CONDITIONAL PURCHASE OFFER MANAGEMENT SYSTEM FOR TELEPHONE CALLS

CROSS-REFERENCE TO RELATED APPLICATIONS

This application is a continuation-in-part of U.S. patent application Ser. No. 08/889,319, filed Jul. 8, 1997 now U.S. Pat. No. 6,085,169, which is a continuation-in-part of U.S. patent application Ser. No. 08/707,660, filed Sep. 4, 1996 now U.S. Pat. No. 5,794,207, each incorporated by reference herein.

The present invention is related to the following United States Patent Applications filed contemporaneously herewith: "Conditional Purchase Offer Management System for Packages," U.S. patent application Ser. No. 09/923,683; "Conditional Purchase Offer Management System for Cruises," U.S. patent application Ser. No. 08/923,618, now U.S. Pat. No. 6,134,534; "Conditional Purchase Offer Management System for Event Tickets," U.S. patent application Ser. No 08/923,530; and "Conditional Purchase Offer and Third-Party Input Management System," U.S. patent application Ser. No. 08/923,524, each assigned to the assignee of the present invention and incorporated by reference herein.

FIELD OF THE INVENTION

The present invention relates generally to a telephone calling system and, more particularly, to a method and system for receiving and processing offers from a calling party to place one or more telephone calls in accordance with restrictions defined by the calling party.

BACKGROUND OF THE INVENTION

With the long distance telephone market becoming nearly saturated with supply, competition among long distance carriers for new business has increased dramatically. On average, over two hundred million (200 million) long distance calls are placed each day in the United States. When profits per subscriber are considered, it is clear why long distance carriers are so aggressive in their pursuit of new accounts. While reputable long distance carriers will spend large amounts of money to legitimately acquire each new account, some carriers will nonetheless change a customer's long distance carrier without the customer's permission, in a process referred to as "slamming."

Once a long distance carrier has made the initial investment to provide a network offering sufficient quality and capacity, the incremental profit to complete each additional call has been estimated to be as high as ninety eight percent (98%). Accordingly, long distance carriers are constantly searching for new techniques and promotions to encourage new accounts. For example, as an added incentive to open or maintain an account, many long distance carriers offer reward programs, such as the True Rewards™ program offered by AT&T, that provide subscribers with discounts and free gifts. In addition, many long distance carriers offer cash incentives to encourage a potential new customer to switch long distance carriers. For example, many long distance companies will mail a check to a potential customer to encourage that customer to switch his or her long distance carrier. If a potential customer cashes the check, the endorsement on the check also serves as an authorization to change the customer's long distance provider. In addition many long distance carriers offer various promotions and marketing campaigns to encourage long distance usage, such as MCI's "Friends and Family"™ promotion and Sprint's "Ten Cents Per Minute"™ promotion. Although such programs help to attract new accounts and build customer loyalty, most consumers are not particularly "brand" conscious when it comes to telephone service, and cost is often the prevailing factor.

Although the costs associated with long distance calls have dropped and are expected to continue dropping dramatically in the United States and other countries as the result of increased competition, the cost of a long distance call remains sufficiently prohibitive to discourage many people from placing as many long distance calls as they would like. In addition, most callers are typically unfamiliar with the rate structure associated with placing calls to various geographical areas at various times of day. Thus, the inability to identify and control the cost of a long distance call has further contributed to the reluctance of many people to place more long distance calls.

While many large customers, such as corporate customers, often have sufficient leverage to negotiate their long distance rates with a long distance carrier, or to permit carriers to bid for their account, it is impractical, given current telephone systems, for long distance providers to individually negotiate long distance rates with the average consumer. In addition, many large customers have accounts with a number of different long distance carriers, and employ "least cost routing" technology in their proprietary private branch exchange (PBX) switches or other customer-premises equipment. This technology enables them to select the most cost-effective carrier on a per-call basis using stored rate information. Again, such a cost-reduction solution is not available to the average consumer, who typically has only one long distance provider.

In addition, a number of systems have been proposed or developed to permit carriers to submit bids for telephone calls. U.S. Pat. No. 5,606,602, entitled "Bidding for Telecommunications Traffic," to Johnson et al., discloses a system that permits carriers to bid on telecommunications traffic. In the disclosed system, each carrier submits a bid informing a central bidding moderator of the rate the carrier is willing to offer subscribers for a connection between two points at a specific time. The bid information is then compiled by the bidding moderator and sorted based on the identified connection points. In addition, the sorted bid information is then transmitted to distributed processors at each participating switch location and to all network management centers. A subscriber can then select a carrier to place a particular call from the sorted bid information.

Recently, the Phonemiser™ and Rate Hunter™ systems have been developed to permit a calling party to contact the system and identify the telephone number of a party to be called. The respective systems then use stored rate information to identify the long distance carrier offering the most cost-effective rate to complete the call. Once found, the call is handled by the identified cost-effective carrier. The Phonemiser™ and Rate Hunter™ systems utilize stored rate information to select a particular carrier, and do not facilitate real-time negotiation with individual long distance carriers. In addition, the Phonemiser™ and Rate Hunter™ systems do not permit the call to be completed in accordance with restrictions specified by the calling party.

As apparent from the above deficiencies with conventional telephone calling systems, a need exists for a system that processes offers from a calling party to place one or more telephone calls in accordance with restrictions defined by the calling party. A further need exists for a caller-driven system that permits a long distance carrier to complete a telephone call at a price set by the calling party, typically below the carrier's published rate. Yet another need exists for a system that permits long distance carriers to stimulate sales of excess network capacity, without compromising their published rate structure.

SUMMARY OF THE INVENTION

Disclosed is a conditional purchase offer (CPO) management system for receiving and processing CPOs for telephone calls from calling parties. The CPO management system processes the CPO to determine whether one or more long distance carriers, referred to herein as an "interexchange carrier" or "carrier," is willing to accept a given CPO and complete a telephone call in accordance with restrictions defined by the calling party. If accepted, the CPO management system binds the calling party on behalf of the accepting interexchange carrier, to form a legally binding contract. According to an aspect of the invention, a calling party can submit a CPO for an individual telephone call, a package of calls to one or more called parties, or for a contract to provide telephone service for a predefined period of time. The conditions defined by the calling party may include the telephone number to be called, the maximum price, one or more preferred carriers, if any, as well as any time limitations, such as a particular time-of-day or minimum call duration.

The CPO management system is interconnected with one or more calling parties and one or more long distance carriers, referred to as interexchange carriers, who may route a call to a desired called party. A calling party, desiring to call a called party, may submit an offer to the CPO management system for one or more telephone calls in accordance with restrictions defined by the calling party. Preferably, the calling party initially dials the telephone number assigned to the CPO management system to provide the CPO management system with the terms of the CPO. Alternatively, the calling party can initially contact the CPO management system by means of online access or e-mail using the Internet. Once the calling party contacts the CPO management system, the calling party then submits the terms of the CPO to the CPO management system, such as the maximum price for the call and the telephone number of the called party.

According to a further aspect of the invention, the CPO management system preferably provides an optional agency feature that permits the CPO management system to accept or reject a given CPO on behalf of certain agency-based interexchange carriers who have delegated such authority to the CPO management system. Thus, the CPO management system preferably (i) evaluates CPOs on behalf of certain agency-based interexchange carriers who have delegated authority for deciding to accept or reject a given CPO to the CPO management system; and (ii) permits broadcast-based interexchange carriers to evaluate CPOs independently. The CPO management system can provide a CPO to each broadcast-based interexchange carrier, for example, by means of a broadcast transmission, or by means of posting the CPO on an electronic bulletin board accessible by each broadcast-based interexchange carrier.

Once the terms of a CPO have been received by the CPO management system, a CPO management process is preferably executed to (i) provide each CPO to the interexchange carriers and (ii) to determine if the terms of the offer have been accepted by any interexchange carrier. The calling party is notified of the response of the interexchange carriers and, if accepted, the calling party is bound to complete and pay for a call having the appropriate restrictions which meet the conditions defined by the calling party.

A more complete understanding of the present invention, as well as further features and advantages of the present invention, will be obtained by reference to the following detailed description and drawings.

BRIEF DESCRIPTION OF THE DRAWINGS

FIG. 5 illustrates a sample table from the carrier database of FIG. 3;

FIG. 7 illustrates a sample table from the CPO database of FIG. 3;

DETAILED DESCRIPTION

Figure 1A:
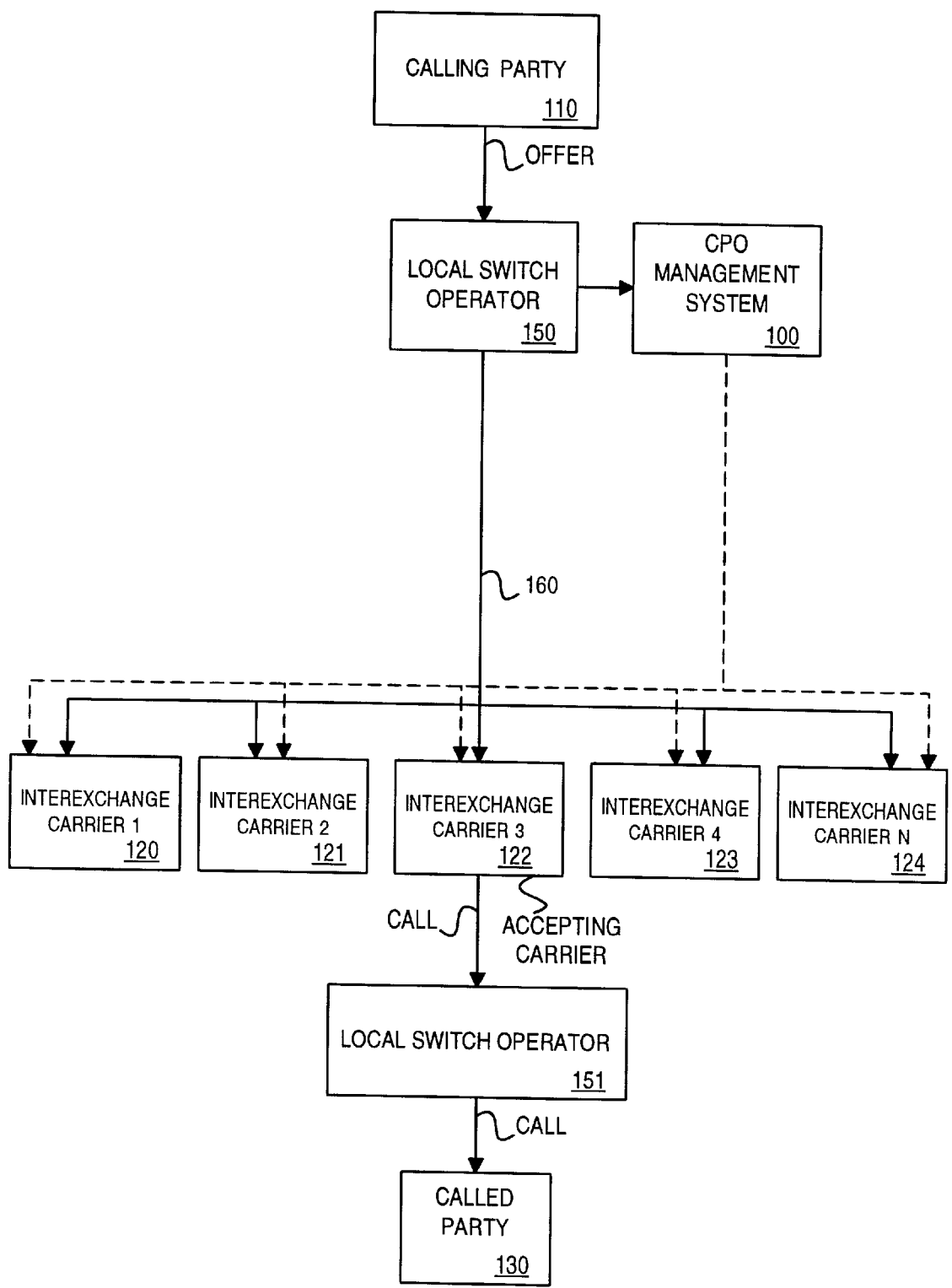
FIG. 1A is a schematic block diagram illustrating a conditional purchase offer (CPO) management system in accordance with one embodiment of the present invention.
Figure 1B:
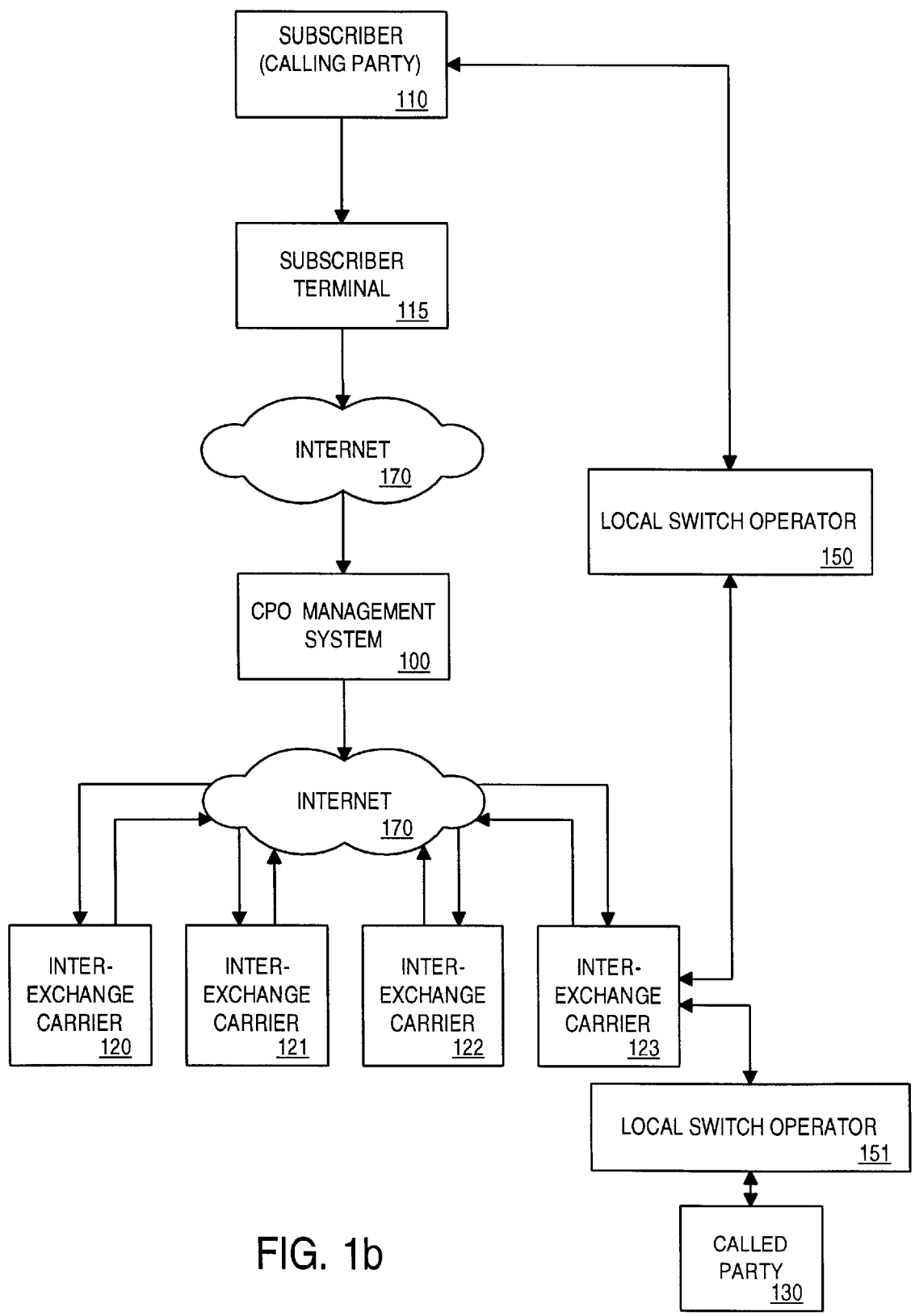
FIG. 1B is a schematic block diagram illustrating a conditional purchase offer (CPO) management system in accordance with an alternate embodiment of the present invention.

FIGS. 1A and 1B show a conditional purchase offer (CPO) management system 100 for receiving and processing CPOs for telephone calls from one or more calling parties, such as calling party 110. The CPO management system 100 processes the CPO to determine whether one or more long distance carriers, such as interexchange carriers 120–124, are willing to accept a given CPO and complete a telephone call in accordance with restrictions defined by the calling party 110. In the United States, for example, the interexchange carriers 120–124 may be AT&T, Sprint and MCI. As discussed further below, if an interexchange carrier 120 accepts a given CPO, the CPO management system 100 binds the calling party 110 on behalf of the accepting interexchange carrier 120, to form a legally binding contract.

As used herein, a CPO is a binding offer containing one or more conditions, submitted by a calling party 110 for the completion of one or more telephone calls, typically at a price defined by the calling party. In this manner, a calling party 110 can preferably submit a CPO for an individual telephone call, a package of calls to one or more called parties 130, or for a contract to provide telephone service for a predefined period of time. In the illustrative embodiment, the conditions defined by the calling party 110 may include the telephone number to be called, the maximum price, one or more preferred carriers, if any, as well as any time limitations, such as a particular time-of-day or minimum call duration. The maximum price may preferably be specified by the calling party 110 in terms of a price for a fixed period of time, such as ten dollars ($10) for a twenty (20) minute telephone call, or in terms of a rate-per-minute, such as fourteen cents per minute ($0.14/minute).

CPO MANAGEMENT SYSTEM

FIG. 1A shows an illustrative network environment for interconnecting the CPO management system 100 with one or more calling parties 110 and one or more interexchange carriers 120–124 who may route a call to a desired called party 130. According to a feature of the present invention, a calling party 110, desiring to call a called party 130, typically identified by a Plain Old Telephone Service (POTS) telephone number, may submit an offer to the CPO management system 100 for a telephone call in accordance with restrictions defined by the calling party. In one preferred implementation, the calling party 110 uses a telephone set 200, shown in FIG. 2, to dial the telephone number assigned to the CPO management system 100, such as a toll-free telephone number, or "800 number," before dialing the telephone number of the called party 130 to provide the CPO management system 100 with the terms of the CPO. Alternatively, the calling party 110 can initially contact the CPO management system 100 by means of facsimile. Once the calling party 110 initially contacts the CPO management system 100, the calling party 110 then submits the terms of the CPO to the CPO management system 100, such as the maximum price for the call and the telephone number of the called party 130.

In a further variation, shown in FIG. 1B, the calling party 110 can initially contact the CPO management system 100 by means of online access or e-mail using a subscriber terminal 115, such as a general-purpose computer, to access the Internet 170. This online embodiment is particularly suited for a calling party 110 desiring to submit a CPO for a package of calls to one or more called parties 130, or for a contract to provide telephone service for a predefined period of time.

Figure 2:
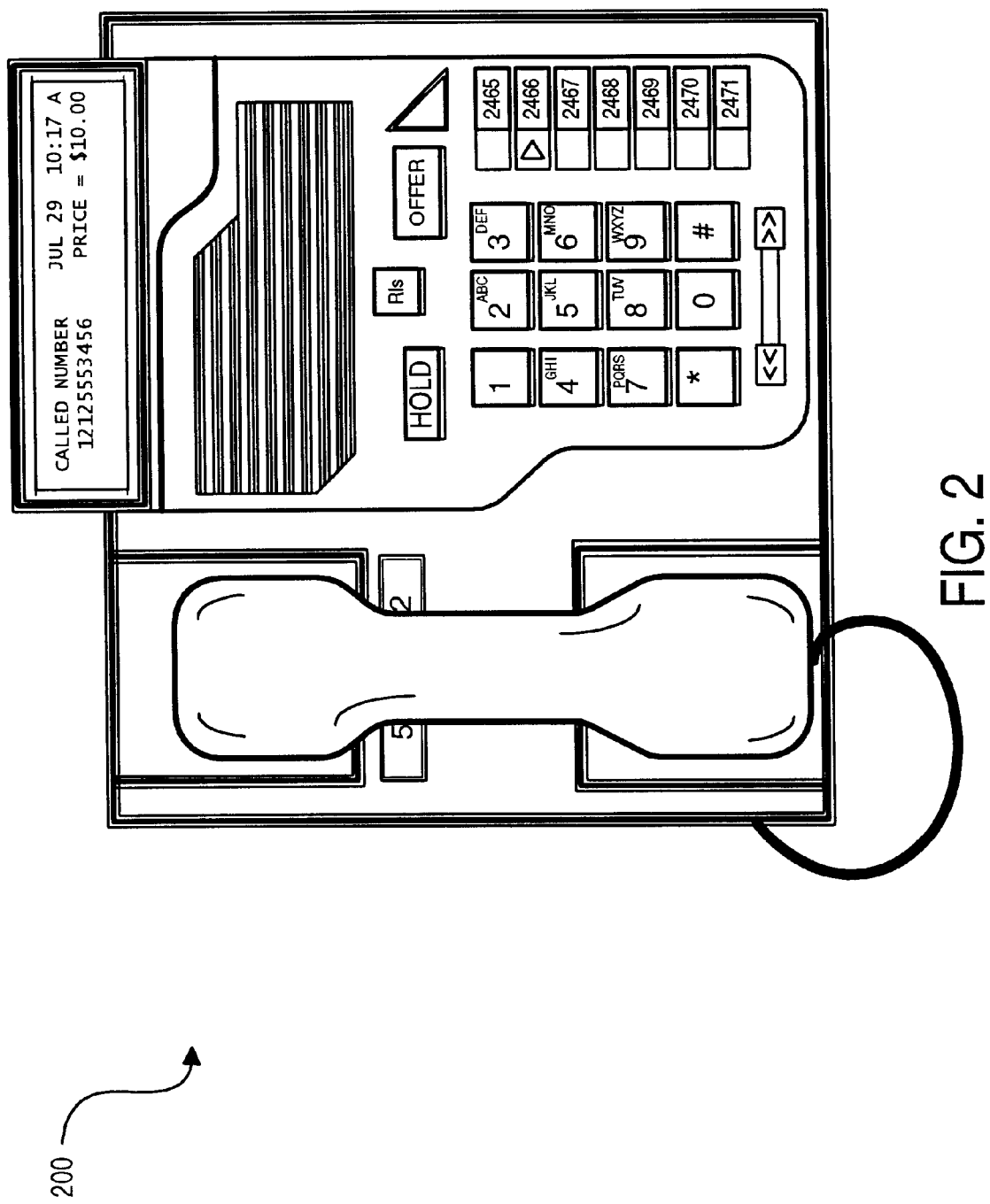
FIG. 2 is a perspective view of an illustrative telephone set utilized by the calling party of FIGS. 1A or 1B.

The terms of the CPO may optionally be displayed to the calling party 110 on the telephone set 200, as shown in FIG. 2. In addition, the telephone set 200 can be specially configured with software for transmitting a CPO to the CPO management system 100 or directly to the interexchange carriers 120. For example, a speed dial button of the telephone set 200 can be programmed to automatically transmit the terms of a CPO to the CPO management system 100 or directly to the interexchange carriers 120. In this manner, the calling party 110 would program the terms of a given CPO using the keypad and function keys on the telephone set 200, and then initiate transmission of the CPO using the speed dial button.

As shown in FIG. 1A, when the calling party 110 dials the telephone number assigned to the CPO management system 100, a connection is typically first established to a local switch operator 150, which is the telephone switching system, for example, of the local telephone company. The local switch operator 150 in turn connects the calling party to the Public Switched Telephone Network (PSTN). The local switch operator 150 is capable of establishing a connection between the calling party 110 and one of a number of interexchange carriers 120–124 over a communications link 160, in a manner well-known in the telephony art. The interexchange carriers 120 may be, for example, providers of long distance carrier networks, including circuit and packet switched networks or combinations thereof, and the communications link 160 may be a cable, fiber or wireless link on which electronic signals can propagate. It is noted that with the increasing trend for long distance carriers to provide local telephone service in many areas, and vice versa, the distinction between the local switch operator 150 and the interexchange carriers 120–124 may become transparent. One or more of the interexchange carriers 120 may be able to route a call between a given calling party 110 and a desired called party 130. For a more detailed discussion of the manner in which a connection is made between a given calling party 110 and a desired called party 130, over a long distance carrier network by an interexchange carrier 120, see U.S. Pat. No. 4,191,860, incorporated by reference herein.

According to a feature of the present invention, the CPO management system 100 preferably provides an optional agency feature that permits the CPO management system 100 to accept or reject a given CPO on behalf of certain agency-based interexchange carriers 120 who have delegated such authority to the CPO management system 100. Thus, the CPO management system 100 preferably (i) evaluates CPOs on behalf of certain agency-based interexchange carriers 120 who have delegated authority for deciding to accept or reject a given CPO to the CPO management system 100; and (ii) permits broadcast-based interexchange carriers 120 to evaluate CPOs independently. Thus, the CPO management system 100 can provide a CPO to each broadcast-based interexchange carrier 120, for the interexchange carrier 120 to independently determine whether or not to accept a given CPO. It is noted that the CPO management system 100 can provide a CPO to each broadcast-based interexchange carrier 120, for example, by means of a broadcast transmission, or by means of posting the CPO, for example, on an electronic bulletin board accessible by each broadcast-based interexchange carrier 120.

In addition, the CPO management system 100 can evaluate a CPO against a number of CPO rules defined by one or more agency-based interexchange carriers 120, to decide on behalf of an agency-based interexchange carrier 120 to accept or reject a given CPO. Thus, the CPO management system 100 can determine if one or more carriers accepts a given CPO by providing the CPO to each carrier and receiving an acceptance or rejection, or by applying the CPO to the CPO rules to render a decision to either accept, reject or counter a CPO on behalf of a particular carrier.

As discussed further below, a CPO rule is a set of restrictions defined by a given agency-based interexchange carrier 120, to define a combination of such restrictions for which the interexchange carrier 120 is willing to accept a commitment to complete one or more telephone calls. In a preferred embodiment, the CPO rules are generated by some type of revenue management system, yield management system, or profit management system of the respective agency-based interexchange carrier 120, or by any system that controls and manages network capacity. For a more detailed discussion of CPO rules, the manner in which they are generated and related security issues, see U.S. patent application Ser. No. 08/889,319, entitled Conditional Purchase Offer Management System, filed Jul. 8, 1997, the parent application to the present invention, which is incorporated by reference herein. Generally, the revenue management system, for example, will employ a CPO rules generation process to generate CPO rules by evaluating current network capacity, pricing and revenue information, as well as historical patterns and external events, to forecast future calling demand.

Once the terms of a CPO have been received by the CPO management system 100, a central server 300, discussed below in conjunction with FIG. 3, will execute a CPO management process 800, discussed below in conjunction with FIGS. 8a and 8b, to (i) provide each CPO to the interexchange carriers 120 and (ii) to determine if the terms of the offer have been accepted by any interexchange carrier 120. Thereafter, the CPO management system 100 or the accepting interexchange carrier 120 notifies the calling party 110 of the response of the interexchange carriers 120 and, if accepted, the calling party 110 is bound to complete and pay for one or more calls having the appropriate restrictions which meet the conditions defined by the calling party 110.

The CPO management system 100 may optionally maintain an audit trail for each CPO that is processed by the CPO management system 100. For a discussion of a suitable audit system, see the parent application to the present invention, incorporated by reference herein above.

According to a further feature of the invention, the CPO management system 100 prevents calling parties 110 from identifying the carrier's minimum price for the one or more telephone calls associated with a given CPO. For example, the CPO management system 100 preferably does not disclose the carrier's minimum price to calling parties and optionally limits the number of CPOs that any calling party 110 can submit within a predefined time period. In addition, the binding nature of the present invention discourages calling parties 110 from submitting CPOs merely to identify the minimum price, since the calling party 110 will be obligated to complete one or more telephone call(s) in accordance with the terms of the CPO. In alternate embodiments, the calling party 110 can be charged a fee or a penalty if a call is not completed when at least one carrier 120 has accepted the CPO, or the CPO management system 100 can evaluate a rating of the calling party 110 containing information regarding the likelihood that the calling party 110 will complete one or more telephone calls corresponding to said CPO. For a more detailed description of a suitable rating system, see U.S. patent application Ser. No. 08/811,349, filed Mar. 4, 1997, entitled AIRLINE PRICE INQUIRY METHOD AND SYSTEM, assigned to the assignee of the present invention and incorporated by reference herein. In one embodiment, the evaluated rating comprises a ratio of completed calls to purchase offers by the customer 110. In this manner, the carriers 120 can be confident that if the carrier accepts the calling party's offer, the calling party 110 will complete the call(s) without using the information to ascertain the carrier's underlying level of price flexibility.

Figure 3:
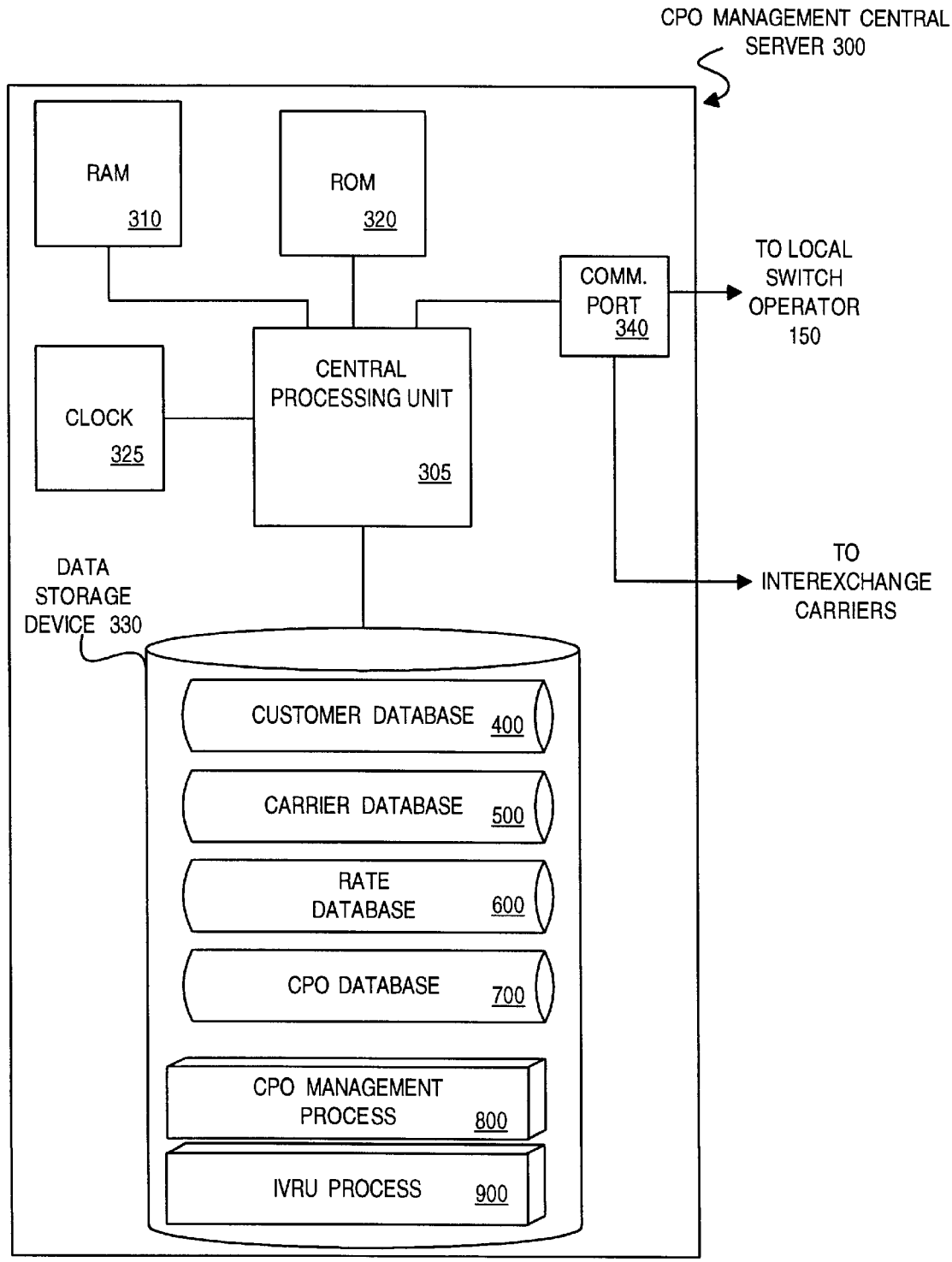
FIG. 3 is a schematic block diagram of a central server used by the CPO management system of FIG. 1.

FIG. 3 is a block diagram showing the architecture of an illustrative CPO management central server 300. The CPO management central server 300 preferably includes certain standard hardware components, such as a central processing unit (CPU) 305, a random access memory (RAM) 310, a read only memory (ROM) 320, a clock 325, a data storage device 330, and a communications port 340. The CPU 305 is preferably linked to each of the other listed elements, either by means of a shared data bus, or dedicated connections, as shown in FIG. 3. The CPU 305 may be embodied as a single commercially available processor, such as Intel's Pentium 100 MHz P54C microprocessor, Motorola's 120 MHz PowerPC 604 microprocessor or Sun Microsystem's 166 MHz UltraSPARC-I microprocessor. Alternatively, the CPU 305 may be embodied as a number of such processors operating cooperatively.

The ROM 320 and/or data storage device 330 are operable to store one or more instructions, discussed further below in conjunction with FIGS. 8 and 9, which the CPU 305 is operable to retrieve, interpret and execute. For example, the ROM 320 and/or data storage device 330 preferably store processes to accomplish the transfer of required payments, charges and debits, between the calling parties 110 and interexchange carriers 120–124.

The CPU 305 preferably includes a control unit, an arithmetic logic unit (ALU), and a CPU local memory storage device, such as, for example, a stackable cache or a plurality of registers, in a known manner. The control unit is operable to retrieve instructions from the data storage device 330 or ROM 320. The ALU is operable to perform a plurality of operations needed to carry out instructions. The CPU local memory storage device is operable to provide high-speed storage used for storing temporary results and control information.

As discussed further below in conjunction with FIGS. 4 through 7, respectively, the data storage device 330 preferably includes a customer database 400, a carrier database 500, a rate database 600, and a CPO database 700. The customer database 400 preferably stores information on each customer of the CPO management system 100, including biographical information and an indication of the local telephone company serving each customer. The carrier database 500 preferably stores information on each carrier which is registered with the CPO management system 100 to provide long distance telephone service to calling parties, including address information. The rate database 600 preferably stores published rate information for each carrier identified in the carrier database 500. Finally, the CPO database 700 preferably contains a record of each CPO being processed by the CPO management system 100, including the terms of the CPO and the associated status.

In an embodiment where the CPO management system 100 provides an agency feature that permits the CPO management system 100 to accept or reject a given CPO on behalf of certain agency-based interexchange carriers 120 who have delegated such authority to the CPO management system 100, the CPO management central server 300 preferably includes a CPO rules database (not shown) for storing the CPO rules. The CPO rules may be stored in a secure database to maintain the integrity and confidentiality of sensitive information included in each CPO rule.

In addition, the data storage device 330 includes a CPO management process 800, discussed further below in conjunction with FIGS. 8a and 8b, and an IVRU process 900, discussed further below in conjunction with FIGS. 9a and 9b. Generally, the CPO management process 800 receives each CPO from a calling party 110, provides the CPO to each appropriate interexchange carrier 120 and thereafter determines if the terms of the offer have been accepted by any interexchange carrier 120. The IVRU process 900 is preferably invoked by the CPO management process 800 to receive the parameters of the CPO from the calling party 110.

The communications port 340 connects the CPO management central server 300 to the local switch operator 150 and interexchange carriers 120–124. The communications port 340 preferably includes multiple communication channels for simultaneously establishing a plurality of connections.

DATABASES

Figure 4:
FIG. 4 illustrates a sample table from the customer database of FIG. 3.

FIG. 4 illustrates an exemplary customer database 400 that preferably stores information on each customer (calling party) of the CPO management system 100, including biographical information and an indication of the local telephone company serving each customer. The customer database 400 maintains a plurality of records, such as records 405–425, each associated with a different customer. For each customer name listed in field 440, the my customer database 400 includes the customer's address in field 445, the manner in which the customer is bound in field 450, an indication of the local telephone company serving the customer in field 455 and the customer's telephone number in field 460. The telephone number stored in field 460 may be utilized, for example, as a customer identifier to index a historical database (not shown) of previous transactions associated with the customer.

As shown in field 450, a given customer may be bound by a pre-existing written or electronic contract on file, which may, for example, authorize an accepting interexchange carrier 120 to charge the calling party 110 for a given call on the calling party's telephone statement or by means of a charge to a credit card, or other general-purpose account. As discussed below, the calling party 110 may be billed for telephone calls completed in accordance with the present invention by the CPO management system 100 or the local switch operator 150, on behalf of the accepting interexchange carrier 120, or directly by the accepting interexchange carrier 120, in a conventional manner.

In an implementation where a CPO obligates a calling party 110 to achieve minimum usage for a predefined time period, for example, where a calling party 110 agrees to spend at least two hundred dollars ($200) over twelve (12) months to obtain a lower rate, the agreed upon terms can be immediately charged to a credit card, or charged on a monthly basis. In addition, the credit card may not be charged unless the calling party 110 fails to meet the obligations of the CPO. For example, the calling party 110 may be billed directly for calls as charges are incurred, and the remaining balance may be charged to the credit card account at the end of the agreed term. In addition, a calling party 110 can be charged a penalty if the calling party 110 does not agree to complete the call after the CPO is accepted by an interexchange carrier 120.

FIG. 5 illustrates an exemplary carrier database 500 which preferably stores information on each carrier which is registered with the CPO management system 100 to provide long distance telephone service to calling parties, including address information. The carrier database 500 maintains a plurality of records, such as records 505–525, each associated with a different carrier. For each carrier name listed in field 540, the carrier database 500 includes address information in field 545. In addition, in an embodiment where the CPO rules of a given carrier are stored in an encrypted format, or otherwise where secure transmissions are required, the cryptographic key of the associated carrier is preferably stored in field 550 of the carrier database 500. Finally, the carrier database 500 preferably stores an indication in field 555 of the percentage of CPOs which have been offered to each carrier which have actually been accepted by each respective carrier. In this manner, the CPO management system 100 can offer a particular CPO to carriers in a sequence that is ranked in accordance with the CPO acceptance rate. In alternate embodiments, the carrier database 500 can incorporate fields to facilitate the processing of CPOs in accordance with sequences based on (i) priorities negotiated by each carrier, or (ii) the highest commission rates paid by the carriers to the CPO management system 100.

Figure 6:
FIG. 6 illustrates a sample table from the published rate database of FIG. 3.

FIG. 6 illustrates an exemplary rate database 600 that preferably stores published rate information for each carrier identified in the carrier database 500. The rate database 600 maintains a plurality of records, such as records 605–625, each associated with a different carrier. For each carrier identified in field 640, the rate database 600 preferably includes the corresponding domestic rate and international rate in fields 645 and 650, respectively.

FIG. 7 illustrates an exemplary CPO database 700 which preferably contains a record of each CPO being processed by the CPO management system 100, including the terms of the CPO and the associated status. The CPO database 700 maintains a plurality of records, such as records 705–725, each associated with a different CPO being processed by the system 100. For each CPO identified by CPO number in field 740, the CPO database 700 includes the date the CPO was received in field 745, an identification (ID) number for the customer associated with the CPO in field 750 and an indication of the telephone number to be called in field 755. The parameters of the calling party's CPO are stored in field 760 of the CPO database 700. The CPO database 700 preferably stores the price the calling party is willing to pay for the call in field 770. Field 765 indicates the accepting carrier, once accepted and field 775 records the current status of the respective CPO, such as pending, accepted, rejected or expired.

PROCESSES

Figure 8A:
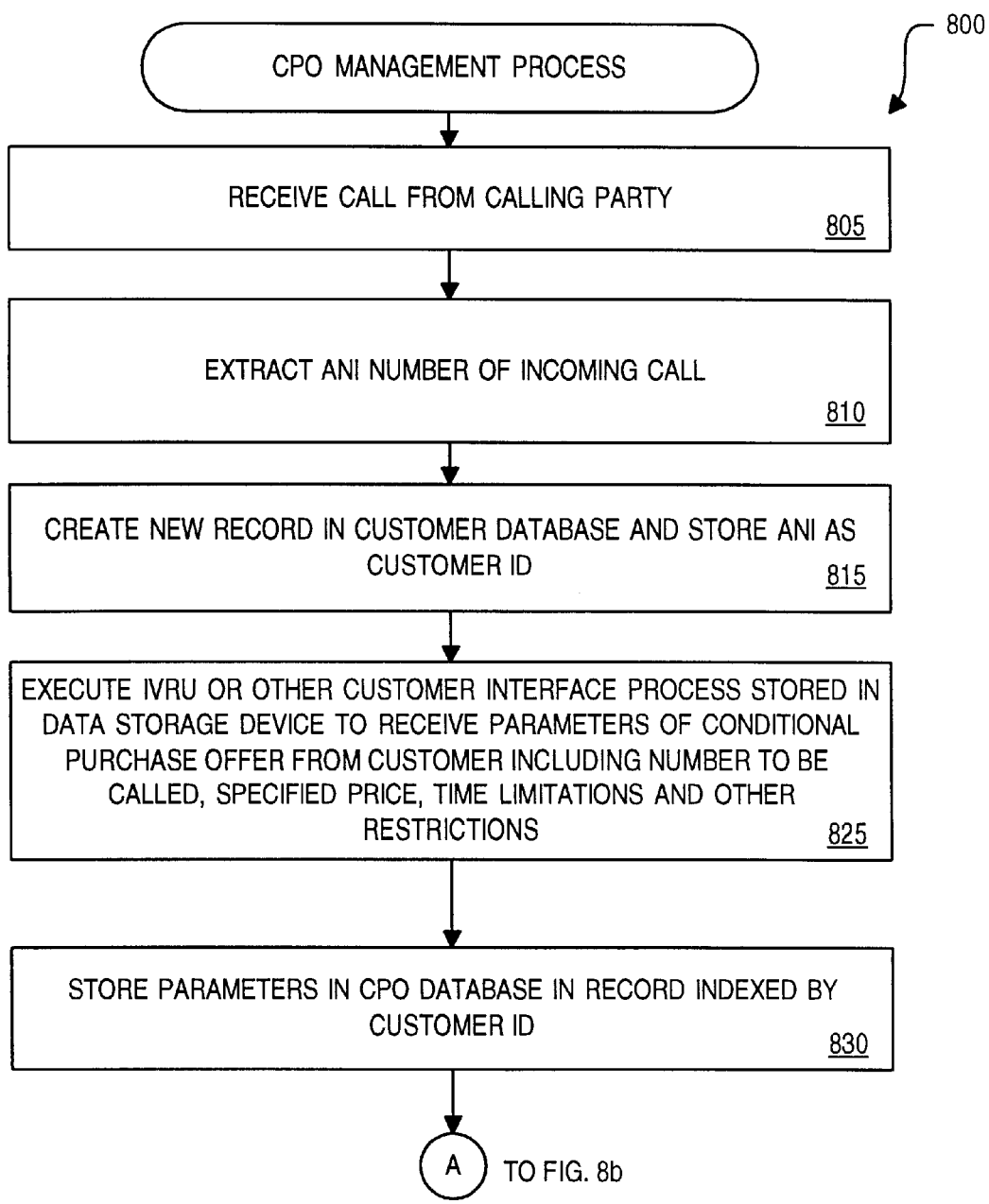
FIGS. 8a and 8b, collectively, are a flow chart describing an exemplary CPO management process implemented by the central server of FIG. 3.
Figure 8B:
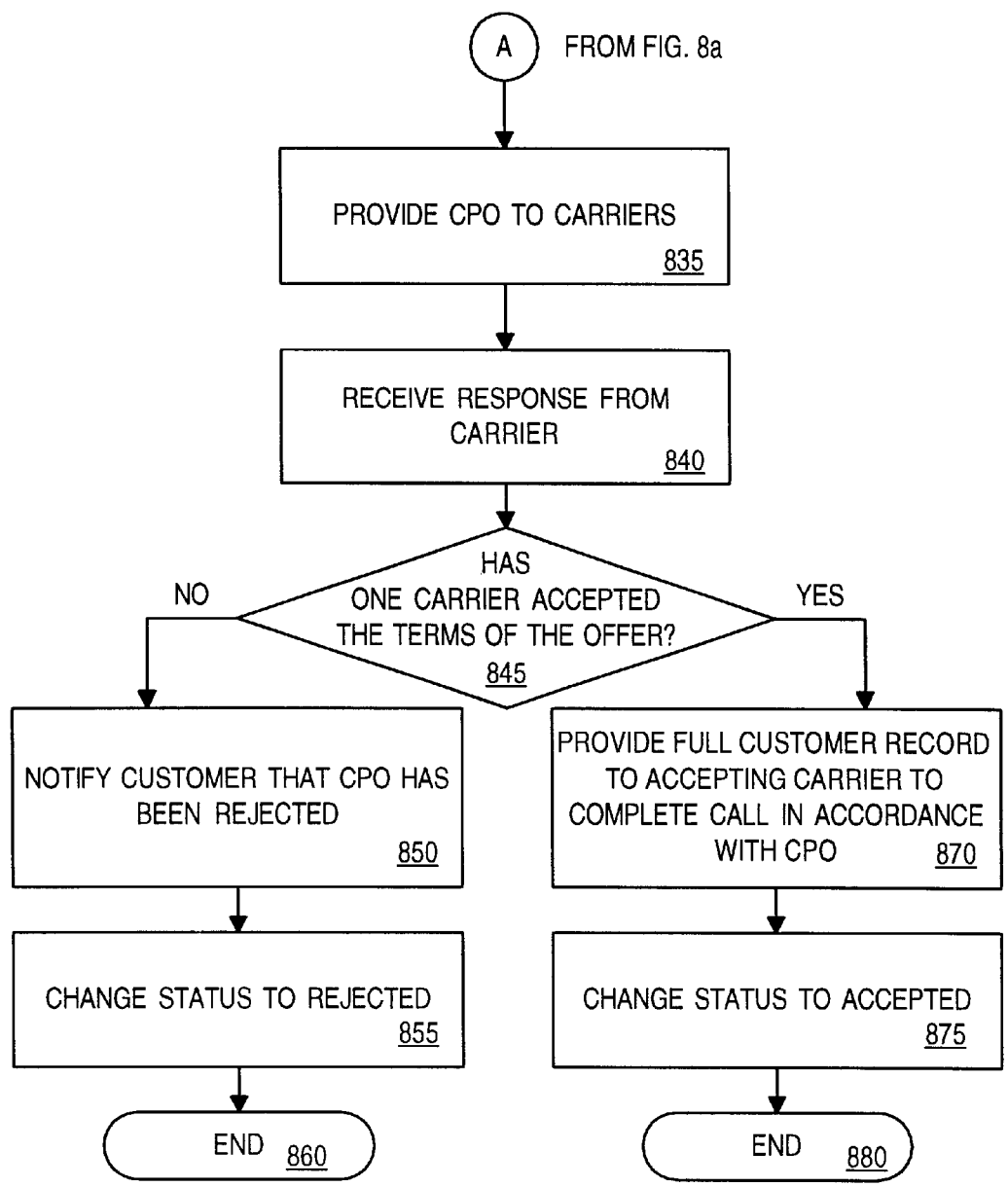

As discussed above, the CPO management central server 300 preferably executes a CPO management process 800, shown in FIGS. 8a and 8b, to receive each CPO from a calling party 110, provide the CPO to each appropriate interexchange carrier 120 and thereafter determine if the terms of the offer have been accepted by any interexchange carrier 120. As illustrated in FIG. 8a, the CPO management process 800 begins the processes embodying the principles of the present invention during step 805, upon receipt of a call from a calling party 110, for example, via a private branch exchange (PBX) switch of the CPO management system 100.

Thereafter, during step 810, the CPO management process 800 will extract the automatic number identification (ANI) number associated with the incoming call. A new record is then created in the customer database 400 during step 815 using the extracted ANI number as the customer identifier recorded in field 460. Thereafter, the IVRU process 900, discussed below in conjunction with FIGS. 9a and 9b, or another customer interface process, is preferably executed during step 825 to receive the parameters of the CPO from the calling party 110, including the telephone number of the called party 130, the maximum price, the manner in which the CPO will be bound and any time limitations and other applicable restrictions. The received parameters of the CPO are then stored in the CPO database 700 during step 830, indexed by the customer identifier (ANI) and then provided to the appropriate carriers during step 835 (FIG. 8b). It is noted that the CPO management system 100 can filter the CPOs provided to each carrier, for example, by only providing the CPO to carriers who can route a call between the calling party 110 and the desired called party 130 or only providing the CPOs to carriers designated by the calling party 110. It is further noted that the CPO management process 800 preferably evaluates the CPO against the CPO rules provided by any agency-based carriers during step 830 as well.

A response to the CPO is preferably received from each carrier during step 840. A test is then performed during step 845 to determine if the terms of the CPO have been accepted by a carrier. If it is determined during step 845 that the terms of the CPO have not been accepted by a carrier, then the calling party 110 is preferably notified during step 850 that the CPO has been rejected. The status of the CPO in the CPO database 700 is then changed to "rejected" during step 855, before program control terminates during step 860.

If, however, it is determined during step 845 that the terms of the CPO have been accepted by a carrier, then the full customer record from the CPO database 700 is preferably provided to the accepting carrier during step 870 for the carrier to complete the call in accordance with the terms specified by the CPO. It is noted that the calling party 110 may be billed for the call by the CPO management system 100 or the local switch operator 150 on behalf of the accepting interexchange carrier 120, or directly by the accepting interexchange carrier 120, in a conventional manner. The local switch operator 150 typically receives a percentage of the total cost to complete the call. Finally, the status of the CPO in the CPO database 700 is then changed to "accepted" during step 875, before program control terminates during step 880.

Figure 9A:
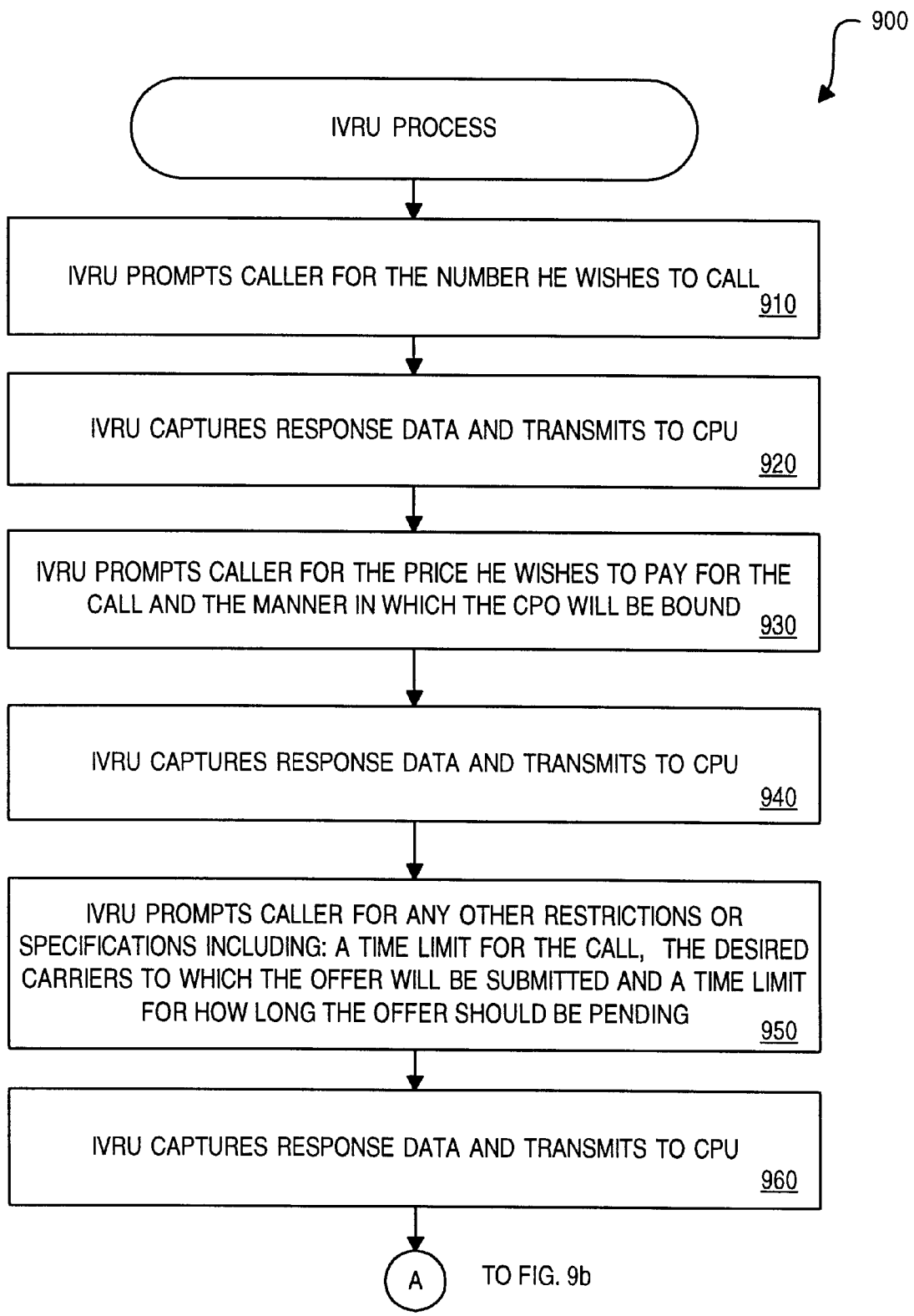
FIGS. 9a and 9b, collectively, are a flow chart describing an exemplary IVRU process implemented by the central server of FIG. 3.
Figure 9B:
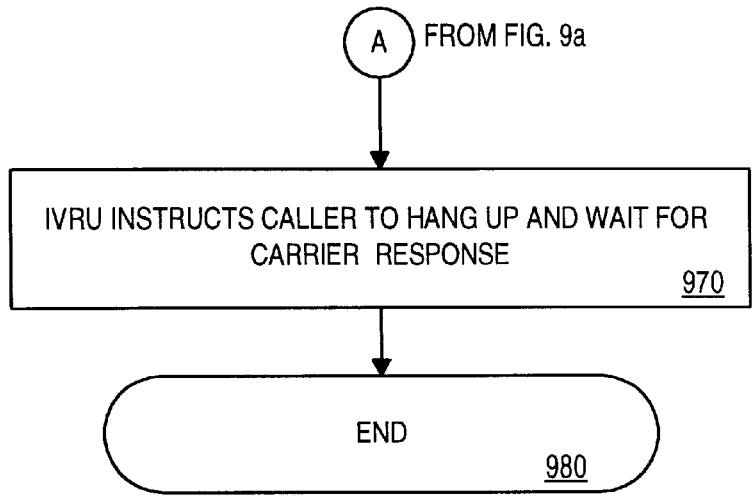

As indicated above, the CPO management process 800 preferably executes the IVRU process 900, shown in FIGS. 9a and 9b, during step 825 to receive the parameters of the CPO from the calling party 110, including the telephone number of the called party 130, the maximum price, and any time limitations and other applicable restrictions. As shown in FIG. 9a, the IVRU process 900 begins the processes embodying the principles of the present invention during step 910 by prompting the calling party 110 for the telephone number of the called party 130. Thereafter, the interactive voice response unit (IVRU) captures the response of the calling party 110 during step 920 and provides the number to be called to the CPU 305.

The IVRU then prompts the calling party 110 for the price the calling party 110 wishes to pay for the call and the manner in which the CPO will be bound, such as a charge to a credit card account, during step 930, and captures the response during step 940 providing the maximum price for the call to the CPU 305. Thereafter, the IVRU prompts the calling party 110 for any other restrictions or specifications associated with the CPO during step 950, including, for example, a time limit for the call, one or more desired carriers, if any, and a time limit for how long the CPO should be pending. The IVRU then captures the response of the calling party 110 during step 960 and provides the additional restrictions or specifications to the CPU 305. Finally, the IVRU process 900 instructs the calling party 110 to hang up and wait for a response during step 970 (FIG. 9b), before program control terminates during step 980.

In this manner, the restrictions of the CPO are received by the CPO management system 100 and then provided to each appropriate interexchange carrier 120. If accepted, the interexchange carrier 120 will complete the call between the calling party 110 and the desired called party 130, in accordance with the terms of the CPO, and the calling party 110 is obligated to pay the accepting interexchange carrier 120 for the cost of the call.

In the embodiment shown in FIG. 1A, a calling party 110 desiring to place a call to a called party 130 picks up the telephone set 200 and dials a telephone number associated with the CPO management system 100. The call is preferably received by a PBX switch or a related call processor. The telephone number of the calling party 110 is then extracted from the call information, and used to access or create a record in the customer database 400. The calling party 110 is then connected to either an IVRU or a live operator to submit the terms of the calling party's CPO, such as the number to be called and the maximum cost. The caller then is preferably instructed to hang up and wait for a response.

Once the CPO is received and processed by the CPO management system 100, it is then provided to a plurality of carriers. Each carrier 120–124 then determines whether to accept or reject the CPO, for example, based on one or more rules based on network capacity balancing. If the CPO is accepted, the CPO management system 100 or the accepting carrier 120 notifies the buyer and places the call over the network of the accepting carrier. If there is a time limit or other restrictions associated with the call, the calling party 110 is preferably notified at the time the call is initially established. The calling party 110 may be billed for the call, for example, by the CPO management system 100, the accepting carrier 120, or by the local telephone company operating the local switch 150. In this manner, the call may be individually charged to a general purpose account, such as a credit card, or may be paid for by means of the calling party's conventional telephone bill.

Similarly, in the embodiment shown in FIG. 1B, a calling party 110 desiring to submit a CPO for telephone service for a predefined period of time, may contact the CPO management system 100 using a subscriber terminal 115. The CPO can specify, for example, the rate which the subscriber is willing to pay for the telephone service and the length of the contractual obligation, as well as any flexibilities or restrictions that the calling party is willing to adhere to, in return for a discounted rate, such as calling during off-peak hours or a minimum spending obligation.

Once the CPO is received and processed by the CPO management system 100, the CPO is then provided to a plurality of carriers. Each carrier 120–124 then determines whether to accept or reject the CPO. If the CPO is accepted, the CPO management system 100 or the accepting carrier 120 notifies the buyer and switches the long distance provider for the calling party to the accepting carrier 120, in an appropriate manner.

It is to be understood that the embodiments and variations shown and described herein are merely illustrative of the principles of this invention and that various modifications may be implemented by those skilled in the art without departing from the scope and spirit of the invention.

We claim:

1. A method for processing telephone calls, comprising:
   obtaining a conditional purchase offer from a customer for one or more telephone calls, said conditional purchase offer containing (a) at least one customer-defined condition including a price and R a payment identifier for specifying a manner in which finds will be paid;
   providing said conditional purchase offer to a plurality of potential telephone carriers;
   receiving from one or more said telephone carriers an acceptance of said conditional purchase offer; and
   binding said customer to purchase said telephone calls if an acceptance is received for said conditional purchase offer.

2. The method of claim 1, further comprising initiating the use of said payment identifier to collect payment.

3. The method of claim 1, wherein said funds may be paid from a general purpose account.

4. The method of claim 1, wherein said funds are charged to a periodic telephone service bill issued by a telephone service provider.

5. The method of claim 1, wherein said conditional purchase offer is received from a telephone set configured to transmit said conditional purchase offers.

6. The method of 1, wherein said conditional purchase offer is for a package of calls to one or more called parties.

7. The method of claim 1, wherein said conditional purchase offer is for a telephone service contract for a predefined period of time.

8. The method of claim 1, wherein said conditional purchase offer is for a telephone service contract for a predefined amount of money.

9. The method of claim 1, wherein said customer-defined condition specifies a particular time of day for said one or more telephone calls.

10. The method of claim 1, wherein said customer-defined condition specifies a minimum duration for said one or more telephone calls.

11. The method of claim 1, wherein said customer-defined condition specifies a maximum duration for said one or more telephone calls.

12. The method of claim 1, wherein said customer-defined condition includes a telephone number of a party to be called.

13. The method of claim 1, wherein said conditional purchase offer is placed by means of a telephone network.

14. The method of claim 1, wherein said conditional purchase offer is placed by means of an electronic network.

15. A method of processing telephone calls, comprising:
   obtaining a conditional purchase offer from a customer for one or more telephone calls, said conditional purchase offer containing at least one customer-defined condition including a price;
   identifying one or more rules from a plurality of telephone carriers, each of said rules containing one or more carrier-defined restrictions; and
   binding said customer to purchase said telephone calls if said customer-defined condition satisfies each of said carrier-defined restrictions of at least one of said rules.

16. The method of claim 15, wherein said conditional purchase offer is received from a telephone set configured to transmit said conditional purchase offers.

17. The method of claim 15, wherein said conditional purchase offer is for a package of calls to one or more called parties.

18. The method of claim 15, wherein said conditional purchase offer is for a telephone service contract for a predefined period of time.

19. The method of claim 15, wherein said conditional purchase offer is for a telephone service contract for a predefined amount of money.

20. The method of claim 15, wherein said carrier-defined restrictions include a price and said price is not disclosed.

21. The method of claim 15, wherein said customer-defined condition specifies a particular time of day for said one or more telephone calls.

22. The method of claim 15, wherein said customer-defined condition specifies a minimum duration for said one or more telephone calls.

23. The method of claim 15, wherein said customer-defined condition specifies a maximum duration for said one or more telephone calls.

24. The method of claim 15, wherein said customer-defined condition includes a telephone number of a party to be called.

25. The method of claim 15, wherein said conditional purchase offer is placed by means of a telephone network.

26. The method of claim 15, wherein said conditional purchase offer is placed by means of an electronic network.

27. A system for processing telephone calls, comprising:
   a communications port for obtaining a conditional purchase offer from a customer for one or more telephone calls and for receiving one or more rules from a plurality of telephone carriers, said conditional purchase offer containing at least one customer-defined condition including a price and each of said rules containing one or more carrier-defined restrictions; and
   a processor for comparing said conditional purchase offer to said rules to determine whether any of said telephone carriers is willing to accept said conditional purchase offer if said customer-defined condition satisfies each of said carrier-defined restrictions of at least one of said rules.

28. The system of claim 27, wherein said conditional purchase offer is received from a telephone set configured to transmit said conditional purchase offers.

29. The system of claim 27, wherein said conditional purchase offer is for a package of calls to one or more called parties.

30. The system of claim 27, wherein said conditional purchase offer is for a telephone service contract for a predefined period of time.

31. The system of claim 27, wherein said conditional purchase offer is for a telephone service contract for a predefined amount of money.

32. The system of claim 27, wherein said communications port is connected to a telephone network.

33. The system of claim 27, wherein said communications port is connected to an electronic network.

34. A method of processing telephone calls, comprising:
   obtaining a conditional purchase offer from a customer for one or more telephone calls, said conditional purchase offer containing at least one customer-defined condition;
   identifying one or more rules from a plurality of telephone carriers, each of said rules containing one or more carrier-defined restrictions including a minimum price;
   comparing said conditional purchase offer to said rules to determine whether any of said telephone carriers is willing to accept said conditional purchase offer if said customer-defined conditions satisfy said carrier-defined restrictions; and
   preventing said customer from identifying said minimum price.

35. The method of claim 34, further comprising limiting the number of said conditional purchase offers which may be obtained from a given customer in a predefined period.

36. The method of claim 34, further comprising assessing a penalty to said customer if a telephone call is not placed when a telephone carrier accepts said conditional purchase offer.

37. The method of claim 34, further comprising evaluating a rating of said customer containing information regarding the likelihood that said customer will place a telephone call corresponding to said conditional purchase offer.

38. The method of claim 34, further comprising binding said customer to purchase said telephone call if said customer-defined conditions satisfy said carrier-defined restrictions.

39. A method of purchasing telephone calls, comprising:
   providing a conditional purchase offer for one or more telephone calls, said conditional purchase offer containing at least one customer-defined condition including a price; and
   obtaining a connection from a telephone carrier to place said one or more telephone calls at said price if said customer-defined conditions satisfy carrier-defined restrictions including an appropriate rate.

40. The method of claim 39, wherein said conditional purchase offer is for a package of calls to one or more called parties.

41. The method of claim 39, wherein said conditional purchase offer is for a telephone service contract for a predefined period of time.

42. The method of claim 39, wherein said conditional purchase offer is for a telephone service contract for a predefined amount of money.

43. The method of claim 39, wherein said customer-defined condition specifies a particular time of day for said one or more telephone calls.

44. The method of claim 39, wherein said customer-defined condition specifies a minimum duration for said one ore more telephone calls.

45. The method of claim 39, wherein said customer-defined condition specifies a maximum duration for said one or more telephone calls.

46. The method of claim 39, wherein said customer-defined condition includes a telephone number of a party to be called.

47. A system for processing telephone calls comprising:

a communications port for obtaining a conditional purchase offer from a customer for one or more telephone calls and for providing said conditional purchase offer to a plurality of potential telephone carriers, said conditional purchase offer containing (a) at least one customer-defined condition and (b) a payment identifier for specifying a manner in which funds will be paid; and a processor for determining if one or more of said telephone carriers accepts said conditional purchase offer and for binding said customer to purchase said telephone calls if an acceptance is received for said conditional purchase offer.

48. The method of claim 1, wherein said conditional purchase offer is placed by access via the internet.

49. The method of claim 15, wherein said conditional purchase offer is placed by access via the internet.

50. The method of claim 27, wherein said communications port is connected to the internet.

* * * * *

UNITED STATES PATENT AND TRADEMARK OFFICE
CERTIFICATE OF CORRECTION

PATENT NO.     : 6,345,090 B1                                     Page 1 of 1
DATED          : February 5, 2002
INVENTOR(S)    : Jay S. Walker et al.

It is certified that error appears in the above-identified patent and that said Letters Patent is hereby corrected as shown below:

Title page,
Item [56], References Cited, U.S. PATENT DOCUMENTS, please add the following references:
-- 5,101,353     3/1992       Lupien et al.
   5,640,390     6/1997       Sakamoto et al.
   5,822,737    10/1998       Ogram --
FOREIGN PATENT DOCUMENTS, please add the following references:
-- EP 0 512 702 A2    11/1992
WO 98/10361    3/1998 --
OTHER PUBLICATIONS, please add the following references:
-- Hensley, H.C., "I'll Take Jarez," Travel Weekly, Vol. 45, page 7, February 1986.
Gibson, R., et al. "Marketing: Fast-Food Chains Hope Diners Swallow New 'Value' Menu of Higher-Priced items," The Wall Street Journal, March 13, 1992, page B1.
Anonymous, "Another Reason to Love Those Afluent Customers, "Jewelers' Circular-Keystone, Vol. CLXX, No. 7, page 64, July 1999. --

Column 9,
Line 27, please delete "." after "meet"

Column 12,
Line 44, please delete "R" and insert therefor -- (b) --

Signed and Sealed this

Fifth Day of November, 2002

Attest:

Attesting Officer

JAMES E. ROGAN
Director of the United States Patent and Trademark Office